US007350228B2

(12) United States Patent
Peled et al.

(10) Patent No.: US 7,350,228 B2
(45) Date of Patent: Mar. 25, 2008

(54) METHOD FOR SECURING DIGITAL CONTENT

(75) Inventors: Ariel Peled, Even-Yehuda (IL); Ofir Carny, Kochav-Yair (IL); Lidror Troyansky, Ramat-Gan (IL); Arik Baratz, Hadera (IL); Oded Arbel, Kiryat Ono (IL)

(73) Assignee: PortAuthority Technologies Inc., Palo Alto, CA (US)

( * ) Notice: Subject to any disclaimer, the term of this patent is extended or adjusted under 35 U.S.C. 154(b) by 818 days.

(21) Appl. No.: 10/051,012

(22) Filed: Jan. 22, 2002

(65) Prior Publication Data

US 2002/0099955 A1    Jul. 25, 2002

Related U.S. Application Data

(60) Provisional application No. 60/263,233, filed on Jan. 23, 2001.

(51) Int. Cl.
*G06F 21/22*    (2006.01)
*H04L 9/00*    (2006.01)
*H04K 1/00*    (2006.01)

(52) U.S. Cl. .............................. 726/6; 726/18; 726/27; 713/193; 705/52

(58) Field of Classification Search .................. 726/26
See application file for complete search history.

(56) References Cited

U.S. PATENT DOCUMENTS

| 4,802,220 | A | * | 1/1989 | Marker, Jr. ................. 380/33 |
| 5,719,937 | A | * | 2/1998 | Warren et al. ............... 380/203 |
| 6,115,533 | A | * | 9/2000 | Tahara et al. ................. 386/94 |
| 6,115,535 | A | | 9/2000 | Iwamoto et al. |
| 6,167,136 | A | | 12/2000 | Chou |
| 6,219,788 | B1 | * | 4/2001 | Flavin et al. ................ 713/194 |
| 6,668,246 | B1 | * | 12/2003 | Yeung et al. .................. 705/57 |
| 6,885,748 | B1 | * | 4/2005 | Wang .......................... 380/201 |
| 6,986,047 | B2 | * | 1/2006 | Giles et al. .................. 713/175 |
| 7,181,625 | B2 | * | 2/2007 | Peled et al. .................. 713/180 |
| 7,216,369 | B2 | * | 5/2007 | Wiseman et al. .............. 726/34 |
| 2004/0098609 | A1 | * | 5/2004 | Bracewell et al. .......... 713/200 |
| 2005/0229011 | A1 | * | 10/2005 | Ebringer et al. ............ 713/189 |
| 2007/0005961 | A1 | * | 1/2007 | Hamblin et al. ............ 713/167 |

OTHER PUBLICATIONS

Symantec, Norton AntiVirus for Windows 95/98 User Guide, 1998, 37-40.*
Symantec, Intelligent Updater Notification Page, Nov. 30, 2000.*

* cited by examiner

Primary Examiner—Christopher Revak (57) ABSTRACT

A method for secure distribution of digital content to an untrusted environment, comprising the steps of; constructing a relatively trusted environment within the untrusted environment; constructing at least two digital inputs, the digital inputs are operable in order to reproduce the digital content; transferring digital media to the relatively trusted environment such that each of the inputs is transmitted via a different path, and combining the inputs in order to reproduce the digital content.

17 Claims, 10 Drawing Sheets

| 1 | 2 | 3 | 4 |
| 5 | 6 | 7 | 8 |
| 9 | 10 | 11 | 12 |

300

3104

340

| 1 | 2 | 7 | 4 |
| 10 | 6 | 9 | 8 |
| 5 | 3 | 11 | 12 |

360

| 1 | 2 | 3 | 4 |
| 5 | 6 | 7 | 8 |
| 9 | 10 | 11 | 12 |

METHOD FOR SECURING DIGITAL CONTENT

CROSS-REFERENCE TO RELATED APPLICATIONS

This application is related to and claims priority from U.S. Provisional Patent Application No. 60/263,233, filed Jan. 23, 2001, the contents of which are hereby incorporated herein by reference in their entirety.

FIELD OF THE INVENTION

The present invention relates generally to the field of digital copyright protection. More specifically, the present invention deals with protection measures against illegal copying of digital audio and/or video.

BACKGROUND OF THE INVENTION

Illegal copying and distribution of multimedia digital content (audio and video) is prevalent in recent years, especially using the Internet. This illegal copying and distribution is an infringement of copyright protection laws and cause financial damages to the rightful owners of the digital content. It is therefore of great interest to find methods that would mitigate illegal copying and/or distribution of multimedia files without offending rightful usage.

Methods for usage rights enforcement of digital media are known. Some methods are desired to monitor digital copying of the digital content. For example, the system described in U.S. Pat. No. 6,115,533 authenticates an information signal prior to mass duplication of the signal by analyzing the signal to detect the presence or absence of a security signal therein, inserting a security signal into the information signal, and recording the modified signal only if no security signal was detected. U.S. Pat. No. 6,167,136 describes a method for securely storing analog or digital data on a data storage medium: an analog information signal is combined with a noise signal. The composite noise and information signal is encrypted with a key, which is derived from the noise signal. The encrypted composite signal is compressed and then recorded on the data storage medium along with an encrypted value of the key. The storage medium data is read, decompressed, and decrypted using a decryption key derived from the stored encrypted key. The data is then converted to an analog signal and combined with a noise correction signal derived from said key to eliminate the noise signal added to the analog information signal before storing the signal on the data storage medium.

Systems that run the MS-Windows™ operating system (OS) are equipped with the OS's Digital Rights Management (DRM) that supplies standard protection to digital content. The DRM consist of a set of filters, such as decryption, decoding and others that manipulate and channel the digital content to the screen card and/or sound card. Each filter exposes a set of virtual pins to connect to filters preceding and succeeding it. Each filter receives the digital content from its predecessor, manipulates it and transfers it to the next filter on the graph. While this traditional component may be viable solution for some digital content, it provides insufficient security to protect premium digital content. Since it's a layered component, at each layer a hacker can insert infringing software that connects between two filters (by the virtual pins) and redirect the digital content to the disk. A hacker may also substitute one of the OS supplied filters with his/hers own, hence hacking into the video path and again, redirect the digital content to the disk.

Other solutions wrap the digital content within encryption and business rules envelope, The rules are stored in a local database protected by encryption. This solution supplies better digital content management capabilities but lacks on the security side. If the local database is breached, the hacker can change the policy of the digital content. Furthermore the digital content encryption is easier to be breached in these types of solutions since it's not an integral part of the digital content player.

While these methods make illegal copying difficult, it is commonly believed that none of the existing methods provides sufficient security determined and competent opponents. Furthermore, once a certain protection method is cracked, the cracking tools and methods may become available to a large community via the Internet, thereby render the digital content effectively unprotected, and therefore an updateable solution is highly desireable.

It is foreseeable that as the availability of disc space and bandwidth for data communication will increase, illegal distribution of video and audio digital content will become prevalent unless effective counter-measures will be taken.

SUMMARY OF THE INVENTION

The present invention seeks to provide a novel method and system for securing the digital path of a digital video and/or audio and/or other digital content, in a manner that would increase substantially the difficulty of illegal copying of the digital content. The system is based on securing the digital path of the digital content bit steam, from its source, until it is finally rendered for display.

This security is basically achieved using one or more of the following methods and techniques:

Obscuring and/or scrambling the digital content in the basic video/audio path, and forming one or more side path that contain the information that is needed for the reconstruction of the digital content, thereby effectively resisting possible copying along the path.

Split the bitstream into at least thereby effectively resist possible copying along the path.

Said splitting and scrambling is best performed as early as possible and recombined at the latest stage, essentially protecting the digital content at all vulnerable points in the path, for example, in the same module that decrypts a previously encrypted digital content.

There is also provided in accordance with a preferred embodiment of the present invention a method that further enhance the security and additionally provides an effective wade of between security level and ease of operation, based on trustworthiness credentials, said trustworthiness credential are based on information that is gathered using methods such as:

Geo-location: authentication support may be included to augment the system's ability to geo-locate the consumer, this may be necessary for business, legal, or other requirements (e.g. time zone authentication which may stem from other business or legal requirements). The level of geo-location authentication may be used as a trustworthiness credential.

Renderer reports: in order to monitor client ability to use external interfaces to access the digital content (e.g. a VCR on a video out interface), the renderer can report the type of video card, and as an option, insert a custom interference to the signal, which would not hamper viewing but prevent recording or will altogether prevent using the video out interface. An information gathering method (e.g. via the DDC—'Display Data Channel' monitor 'Plug and Play' communication protocol) could also be used to report the type of monitor used. The information gathered can be used in order to estimate trustworthiness credentials.

Authentication: the identity of the consumer can be authenticated. This can be achieved by compounding several methods, which could be a software/hardware key/challenge-response scheme, user and password-phrase, etc. The level of consumer identity authentication may be used as a trustworthiness credential.

There is also provided in accordance with a preferred embodiment of the present invention a system that, in order to further enhance the security of the system, incorporates one Or more of he following methods and techniques;

Path authentication: the system assures that the path is composed only of components that should participate in it, and that it was not subjected to tempering before and/or during the passage of the digital content throughout the path.

Path consolidation: in cases where the path is implemented using connected software filters ("filter graph") the secure path is composed of tamper resistant, consolidated filters, which use minimal external interfaces, thereby increasing the security of the system. The number of filters is maintained as low as possible. In cases where no other constraint exists, only one such filter is included (e.g. in cases where compatibility with existing components or with a standard interface is required, the system mazy be composed of tree filters: namely, source filter, video renderer and audio output or other combinations according to the compatibility requirements). The interface of each filter is preferably encrypted and/or secured using other methods.

In-path encryption/decryption: for encrypted digital content, encryption and decryption is done within the secure video path; hereby eliminating the chance of intercepting decrypted digital content outside the secure video path.

There is also provided in accordance with a preferred embodiment of the present invention methods that increase the overall security that are based on:

Automatic update support: The consumer side component should report, while communicating with the central server and/or the digital content servers, its update level, and either perform automatic updates as necessary (alternatively, the consumer could query the server for the current/necessary update version and initiate the update without reporting the current version) or prompt the consumer to initiate them, either way, the update level may be used as a trustworthiness credential when deciding to allow a certain transaction, as will be other security enhancing options.

Hardware security options: in addition to enhancing the security of software tamper resistance, dedicated hardware can be optionally used (perhaps as an optional, security credentials enhancing feature), in order to support geolocation and authentication.

According to a first aspect of the present invention there is provided a method for secure distribution of digital content to an untrusted environment, comprising the steps of: constructing a relatively trusted environment within the untrusted environment; constructing at least two digital inputs, the digital inputs are operable in order to reproduce the digital content; transferring digital media to the relatively trusted environment such that each of the inputs is transmitted via a different path, and combining the inputs in order to reproduce the digital content.

In a preferred embodiment of the present invention, the digital content is a document.

In another preferred embodiment of the present invention, the digital content is multimedia digital content.

In another preferred embodiment of the present invention, the multimedia digital content is an audio digital content.

In another preferred embodiment of the present invention, the multimedia digital content is a video digital content.

In another preferred embodiment of the present invention, the multimedia digital content consists of at least two different streams.

In another preferred embodiment of the present invention, at least one of the streams consists of video digital content.

In another preferred embodiment of the present invention, at least one of the streams consists of audio digital content.

In another preferred embodiment of the present invention, at least one of the streams consists of textual digital content.

In another preferred embodiment of the present invention, the untrusted environment comprises a consumer's computer.

In another preferred embodiment of the present invention, the relatively trusted environment comprises a software component.

In another preferred embodiment of the present invention, the software component is updateable.

In another preferred embodiment of the present invention, the software component comprises at least one tamper resistant software component.

In another preferred embodiment of the present invention, at least one of the software components is updateable.

In another preferred embodiment of the present invention, the relatively trusted environment comprises a hardware component.

In another preferred embodiment of the present invention, the hardware component comprises at least one tamper resistant hardware component.

In another preferred embodiment of the present invention, the relatively trusted environment comprises a firmware component.

In another preferred embodiment of the present intention, the firmware component is updateable.

In another preferred embodiment of the present invention, the firmware component comprises at least one tamper resistant firmware component.

In another preferred embodiment of the present invention, at least one of the tamper resistant firmware components is updateable.

In another preferred embodiment of the present invention, the relatively trusted environment comprises at least two components.

In another preferred embodiment of the present invention, at least one of the components comprises a software component.

In another preferred embodiment of the present invention, the software component is updateable.

In another preferred embodiment of the present invention, the software component comprises at least one tamper resistant software component.

In another preferred embodiment of the present invention, at least one of the software components is updateable.

In another preferred embodiment of the present invention, at least one of the components comprises a hardware component.

In another preferred embodiment of the present invention, the hardware component comprises at least one tamper resistant hardware component.

In another preferred embodiment of the present invention, at least one of the components comprises a firmware component.

In another preferred embodiment of the present invention, the software firmware is updateable.

In another preferred embodiment of the present invention, the firmware component comprises at least one tamper resistant firmware component.

In another preferred embodiment of the present invention, at least one of the firmware components is updateable.

In another preferred embodiment of the present invention, at least one of the inputs comprise of a key.

In another preferred embodiment of the present invention, the key is a cryptographic key.

In another preferred embodiment of the present invention, the key is a scrambling key.

In another preferred embodiment of the present invention, at least one of the inputs comprises of a scrambled copy of the digital content, and at least one other input comprise of the information needed for the reproduction.

In another preferred embodiment of the present invention, a group of at least two of the inputs comprise of a function of a scrambled copy of the digital content, and at least one other input comprise of the information needed for reconstruction.

In another preferred embodiment of the present invention, the reproduction results in an output that is identical to the digital content.

In another preferred embodiment of the present invention, the reproduction results in an output that is sufficiently similar to the digital content.

In another preferred embodiment of the present invention, a group of at least two of the inputs comprise of a function of the digital content.

In another preferred embodiment of the present invention, the function comprise of splitting the digital content to the inputs.

In another preferred embodiment of the present invention, the method comprise of using at least one updateable component.

In another preferred embodiment of the present invention, the updateable component is associated with a revision level identifier.

In another preferred embodiment of the present invention, the revision level identifier is a version number.

In another preferred embodiment of the present invention, the revision level identifier is revision date.

In another preferred embodiment of the present invention, at least one aspect of operation of the underlying system depends on the revision level.

In another preferred embodiment of the present invention, at least some functionality of the underlying system is limited if the revision level does not belong to a specific set of revision levels.

In another preferred embodiment of the present invention, the limited functionality comprise of the ability to receive a set of digital content.

In another preferred embodiment of the present invention, the limited functionality comprise of the ability to receive a set of digital content in a specific format.

In another preferred embodiment of the present invention, the limited functionality comprise of the ability to receive a set of digital content in a specific method.

In another preferred embodiment of the present invention, the revision level is communicated to at least one other component of the underlying system by the updateable component.

In another preferred embodiment of the present invention, the communication is initiated by the updateable component.

In another preferred embodiment of the present invention, the communication is part of another communication that is part of the normal workflow of the underlying system.

In another preferred embodiment of the present invention, the communication is initiated by the other component of the underlying system.

In another preferred embodiment of the present invention, a component within the untrusted environment queries another component in the underlying system for revisioned version of the updateable component.

In another preferred embodiment of the present invention, transfer of the updateable component is performed automatically without intervention.

In another preferred embodiment of the present invention, transfer of the updateable component is initiated by approval.

In another preferred embodiment of the present invention, installation of the updateable component is performed automatically without intervention.

In another preferred embodiment of the present invention, installation of the updateable component is initiated by approval.

In another preferred embodiment of the present invention, the digital content is split into the separate inputs in a relatively trusted server, the server is operable to deliver the digital content to the relatively trusted environment in the form of the separate inputs.

In another preferred embodiment of the present invention, wherein the digital content arrive in the form of second separate inputs different from the first separate inputs to the relatively trusted server, the relatively trusted server is operable to rearrange the digital content to the form of the first separate inputs.

In another preferred embodiment of the present invention, the digital content arrive in the form of the separate inputs to a server, the server is operable to deliver the digital content to the relatively trusted environment in the form of the separate inputs.

According to a second aspect of the present invention there is provided a method for secure distribution of digital content comprising the steps of gathering input from at least one source; producing trustworthiness credentials about the digital content's intended recipient environment based on the input; evaluate the intended recipient environment's trustworthiness credentials; determine a distribution policy according to the trustworthiness credentials evaluation, and performing decisions about the distribution according to the policy.

In a preferred embodiment of the present invention, the digital content is a document.

In another preferred embodiment of the present invention, the digital content is multimedia digital content.

In another preferred embodiment of the present invention, the multimedia digital content is an audio digital content.

In another preferred embodiment of the present invention, the multimedia digital content is a video digital content.

In another preferred embodiment of the present invention, the multimedia digital content consists of at least two different streams.

In another preferred embodiment of the present invention, the credentials comprise geo-location information.

In another preferred embodiment of the present invention, the credentials comprise geo-location authentication level information.

In another preferred embodiment of the present invention, the credentials comprise authentication level information.

In another preferred embodiment of the present invention, the credentials comprise information gathered in the past.

In another preferred embodiment of the present invention, the credentials further comprise information gathered from analysis of the information gathered in the past.

In another preferred embodiment of the present invention, the information gathered in the past comprise of usage information.

In another preferred embodiment of the present invention, the credentials comprise of information about the environment into which the digital content is to be distributed.

In another preferred embodiment of the present invention, the information about the environment into which the digital content is to be distributed comprise of information about the software environment into which the digital content is to be distributed.

In another preferred embodiment of the present invention, information about the environment into which the digital content is to be distributed comprise of information about the hardware environment into which the digital content is to be distributed.

In another preferred embodiment of the present invention, the information about the hardware environment into which the digital content is to be distributed comprises information about the video output hardware in that environment.

In another preferred embodiment of the present invention, the information about the hardware environment into which the digital content is to be distributed comprises information about the sound output hardware in that environment.

In another preferred embodiment of the present invention, the information about the environment into which the digital content is to be distributed comprise of information about the firmware environment into which the digital content is to be distributed.

In another preferred embodiment of the present invention, the credentials comprise of reports from at least one relatively trusted component.

In another preferred embodiment of the present invention, at least one of the components resides in the consumer's computer.

In another preferred embodiment of the present invention, at least one of the components is connected to the consumer's computer.

In another preferred embodiment of the present invention, at least one of the components is a software component.

In another preferred embodiment of the present invention, at least one of the components is a firmware component.

In another preferred embodiment of the present invention, at least one of the components is a tamper resistant component.

In another preferred embodiment of the present invention, at least one of the components is a hardware component.

In another preferred embodiment of the present invention, at least one of the software components is updateable.

In another preferred embodiment of the present invention, at least one of the firmware components is updateable.

In another preferred embodiment of the present invention, the method comprise of using at least one updateable component.

In another preferred embodiment of the present invention, the updateable component is associated with a revision level identifier.

In another preferred embodiment of the present invention, the revision level identifier is a version number.

In another preferred embodiment of the present invention, the revision level identifier is revision date.

In another preferred embodiment of the present invention, at least one aspect of operation of the underlying system depends on the revision level.

In another preferred embodiment of the present invention, at least some functionality of the underlying system is limited if the revision level does not belong to a specific set of revision levels.

In another preferred embodiment of the present invention, the limited functionality comprise of the ability to receive a set of digital content.

In another preferred embodiment of the present invention, the limited functionality comprise of the ability to receive a set of digital content in a specific format.

In another preferred embodiment of the present invention, the limited functionality comprise of the ability to receive a set of digital content in a specific method.

In another preferred embodiment of the present invention, the revision level is communicated to at least one other component of the underlying system by the updateable component.

In another preferred embodiment of the present invention, the communication is initiated by the updateable component.

In another preferred embodiment of the present invention, the communication is part of another communication that is part of the normal workflow of the underlying system.

In another preferred embodiment of the present invention, the communication is initiated by the other component of the underlying system.

In another preferred embodiment of the present invention, a component within the untrusted environment queries another component in the underlying system for revisioned version of the updateable component.

In another preferred embodiment of the present invention, transfer of the updateable component is performed automatically without intervention.

In another preferred embodiment of the present invention, transfer of the updateable component is initiated by approval.

In another preferred embodiment of the present invention, installation of the updateable component is performed automatically without intervention.

In another preferred embodiment of the present invention, installation of the updateable component is initiated by approval.

In another preferred embodiment of the present invention, the credentials comprise of the revision level.

According to a third aspect of the present invention there is provided a method for secure distribution of digital content comprising the steps of: transferring digital media to an untrusted environment; using a relatively trusted environment within the untrusted environment operable to receive the digital content, the relatively trusted environment comprises of mechanisms to restrict tampering with the relatively trusted environment.

In a preferred embodiment of the present invention, the relatively trusted environment comprises at least two components.

In another preferred embodiment of the present invention, the components comprise at least one hardware component.

In another preferred embodiment of the present invention, the components comprise at least one software component.

In another preferred embodiment of the present invention, the components comprise at least one firmware component.

In another preferred embodiment of the present invention, the relatively trusted environment is a hardware component.

In another preferred embodiment of the present invention, the relatively trusted environment is a firmware component.

In another preferred embodiment of the present invention, the relatively trusted environment is a software component.

In another preferred embodiment of the present invention, the components comprise a watchdog component, the watchdog component is capable of monitoring other components of the relatively trusted environment.

In another preferred embodiment of the present invention, the monitoring comprise of authentication.

In another preferred embodiment of the present invention, the authentication comprise authentication of a certificate.

In another preferred embodiment of the present invention, the certificate is a cryptographic certificate.

In another preferred embodiment of the present invention, the authentication comprise authentication of the code of the component.

In another preferred embodiment of the present invention, the authentication of the code of the component comprise calculating a derivative of the code.

In another preferred embodiment of the present invention, the authentication of the code of the component comprises analysis of the potential operation of the code.

In another preferred embodiment of the present invention, the authentication comprise of a challenge-response method which comprise of a step in which the watchdog component queries the authenticated component issuing a input and further comprises of a later step in which the authenticated component issue an output to the watchdog the output dependent on the input and the authentication is based on the correctness of the output depending on the input.

In another preferred embodiment of the present invention, the monitoring comprises monitoring of the operation of the components.

In another preferred embodiment of the present invention, the monitoring of the operation of the components comprises monitoring of used interfaces.

In another preferred embodiment of the present invention, the monitoring of used interfaces comprise monitoring of used operating system calls.

In another preferred embodiment of the present invention, the monitoring of used interfaces comprises monitoring of file operations.

In another preferred embodiment of the present invention, the monitoring of used interfaces comprises monitoring of memory operations.

In another preferred embodiment of the present invention, the monitoring of used interfaces comprises monitoring of.

In another preferred embodiment of the present invention, the monitoring of used interfaces comprises monitoring of driver operations.

In another preferred embodiment of the present invention, the monitoring of used interfaces comprise monitoring of input operations.

In another preferred embodiment of the present invention, the monitoring of used interfaces comprise monitoring of output operations.

In another preferred embodiment of the present invention, the monitoring of used interfaces comprises monitoring of interfaces used by interfaced entities.

In another preferred embodiment of the present invention, the monitoring of used interfaces comprise monitoring of at least one of the following: interfaces used by interfaced entities, output operations, input operations, driver operations, communication operations, used operating system calls, file operations, memory operations and used interfaces.

In another preferred embodiment of the present invention, the relatively trusted environment comprises at least one updateable component.

In another preferred embodiment of the present invention, the updateable component is associated with a revision level identifier.

In another preferred embodiment of the present invention, the revision level identifier is a version number.

In another preferred embodiment of the present invention, the revision level identifier is revision date.

In another preferred embodiment of the present invention, at least one aspect of operation of the underlying system depends on the revision level.

In another preferred embodiment of the present invention, at least some functionality of the underlying system is limited if the revision level does not belong to a specific set of revision levels.

In another preferred embodiment of the present invention, theo limited functionality comprise of the ability to receive a set of digital content.

In another preferred embodiment of the present invention, the limited functionality comprise of the ability to receive a set of digital content in a specific format.

In another preferred embodiment of the present invention, the limited functionality comprise of the ability to receive a set of digital content in a specific method.

In another preferred embodiment of the present invention, the revision level is communicated to at least one other component of the underlying system by the updateable component.

In another preferred embodiment of the present invention, the communication is initiated by the updateable component.

In another preferred embodiment of the present invention, the communication is part of another communication that is part of the normal workflow of the underlying system.

In another preferred embodiment of the present invention, the communication is initiated by the other component of the underlying system.

In another preferred embodiment of the present invention, a component within the untrusted environment queries another component in the underlying system for revisioned version of the updateable component.

In another preferred embodiment of the present invention, transfer of the updateable component is performed automatically without intervention.

In another preferred embodiment of the present invention, transfer of the updateable component is initiated by approval.

In another preferred embodiment of the present invention, installation of the updateable component is performed automatically without intervention.

In another preferred embodiment of the present invention, installation of the updateable component is initiated by approval.

In another preferred embodiment of the present invention, at least one of the components comprise of functionality to monitor at least one of its interfaces.

In another preferred embodiment of the present invention, the monitoring comprise of authentication.

In another preferred embodiment of the present invention, the authentication comprise authentication of a certificate.

In another preferred embodiment of the present invention, the certificate is a cryptographic certificate.

In another preferred embodiment of the present invention, the authentication comprise of a challenge-response method which comprise of a step in which the component queries the interfaced entity issuing a input and further comprises of a later step in which the interfaced entity issue an output to the component the output dependent on the input and the authentication is based on the correctness of the output depending on the input.

In another preferred embodiment of the present invention, the method comprise of functionality to monitor at least one of the interfaces used by the underlying system.

In another preferred embodiment of the present invention, the monitoring comprise of authentication.

In another preferred embodiment of the present invention, the authentication comprise authentication of a certificate.

In another preferred embodiment of the present invention, the certificate is a cryptographic certificate.

In another preferred embodiment of the present invention, the authentication comprise of a challenge-response method which comprise of a step in which the interfaced entity is queried by issuing a input and further comprises of a later step in which the interfaced entity issue back an output the output dependent on the input and the authentication is based on the correctness of the output depending on the input.

In another preferred embodiment of the present invention, the digital content arrives into the relatively trusted environment in a cryptographically encrypted format.

In another preferred embodiment of the present invention, information gathered from monitoring by at least one component is transferred to the watchdog component by the component.

In another preferred embodiment of the present invention, information gathered by the watchdog component is transferred as credentials information to a credentials based decision making mechanism.

In another preferred embodiment of the present invention, information gathered by the watchdog component is transferred as credentials information to a credentials based decision-making mechanism.

In another preferred embodiment of the present invention, the relatively trusted environment comprises mechanism to restrict coping of at least one of the outputs the relatively trusted environment generates.

In another preferred embodiment of the present invention, the output is part of an internal interface.

In another preferred embodiment of the present invention, the output is an external output.

In another preferred embodiment of the present invention, the external output is sound output.

In another preferred embodiment of the present invention, the external output is video output.

In another preferred embodiment of the present invention, the external output is analog output.

In another preferred embodiment of the present invention, the analog output is analog sound output.

In another preferred embodiment of the present invention, the analog output is analog video output.

In another preferred embodiment of the present invention, the mechanism to restrict coping comprise of altering the output in order to change a quality of the copy that is produced by the copying.

In another preferred embodiment of the present invention, the quality of the copy is the observable quality of the copy.

In another preferred embodiment of the present invention, the change of the quality is to adversely effect the quality.

In another preferred embodiment of the present invention, the copying is digital copying.

In another preferred embodiment of the present invention, the copying is non-digital copying.

In another preferred embodiment of the present invention, the copying is digital copying that involves a non-digital transition.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

The present invention seeks to provide a system and a method for digital content protection, in order to mitigate the hazards of copyright infringement. For a better understanding of the invention and to show how the same may be carried into effect, reference will now be made, purely by way of example, to the accompanying drawings.

Figure 1:
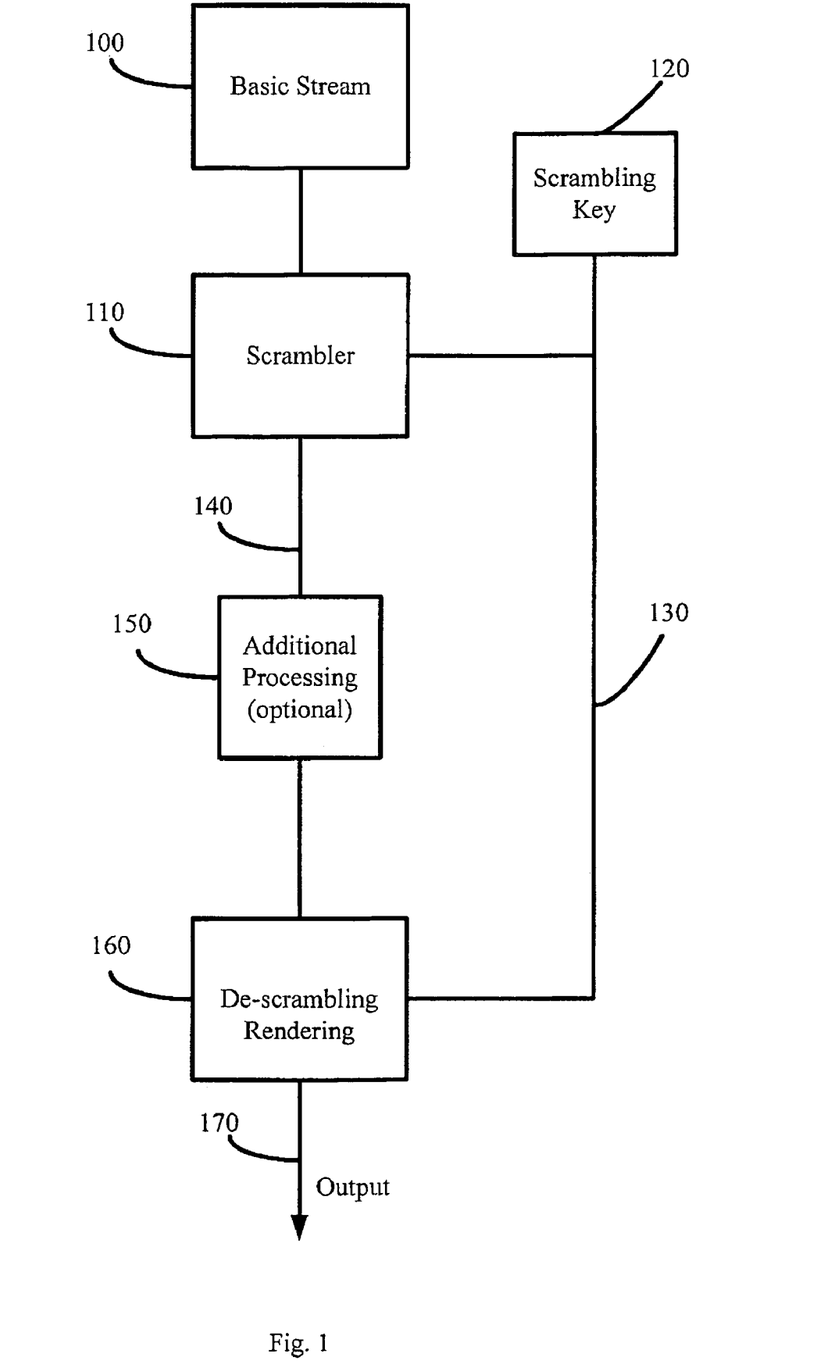
FIG. 1 is a simplified conceptual flow illustration of a method for copy protection for digital content, constructed and operative in accordance with a preferred embodiment of the present invention.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1 is a simplified conceptual flow illustration of a system for copy protection for digital content, constructed and operative in accordance with a preferred embodiment of the present invention. In the system of FIG. 1 parts of the basic stream 100 are scrambled, using a scrambling module 110, thereby substantially degrading the quality of the final digital content. The scrambling is preferably induced by a secret key 120. The information that is needed in order to reproduce the original digital content is included in a stream 130 that undergoes a different path. The digital content in main path 140 may be subjected to further processing 150. One component of the system, dubbed the de-scrambler 160, and is preferably a tamper-resistant component, receives information from both paths and performs the computations that are required in order to reproduce the desired digital content 170.

Figure 2:
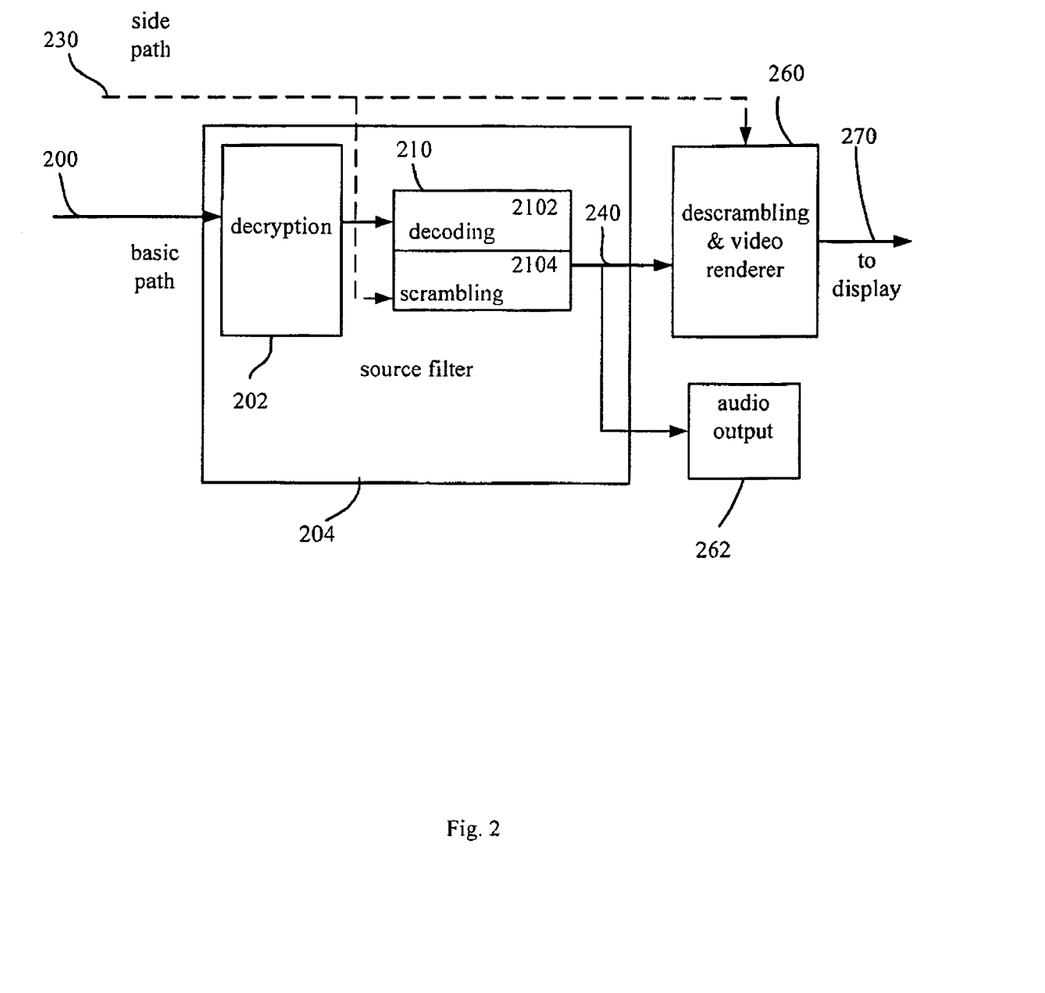
FIG. 2 is a simplified illustration of a system for copy protection, substantially similar to the system described in FIG. 1, operative in accordance with a preferred embodiment of the present invention.

Reference is now made to FIG. 2, which is a simplified illustration of a system, substantially similar to the system described in FIG. 1, operative in accordance with a preferred embodiment of the present invention. In the system of FIG. 2 the digital content in the basic path 200, is encrypted, using any standard encryption technique, in order to enhance the security level. The basic path enters a module 204, dubbed "source filter". The decryption module 202 decrypts the digital content. The decrypted digital content is thereafter being decoded by the decoding sub-module 2102 (e.g., if the digital content is a video digital content, compressed/encoded using standard MPEG encoding, the decoder perform decoding/uncompressing, which results in a bitstream that represent sequence of frames and an audio stream). The scrambling sub-module 2104 thereafter scrambled the digital content (e.g., by changing the order of several macro-blocks in some of the frames). The resulted bitstream 240 represents a crippled digital content that can be properly rendered only by using side information (e.g., in cases where the digital content is a video digital content, and the scrambling consists of changing the order of some macro-blocks, the side information should reveal the correct order of the macro-blocks.) The renderer and descrambler module 260 reproduces the desired digital content; if the digital content is a video digital content, then the renderer produces the to-be displayed frames and uses the information in the side-path 230 in order to reconstruct the correct order of the macro-blocks. The resulted sequence of frames 270 is ready to be displayed by a standard display device.

Note that, while scrambling is essentially a form of encryption, the scrambling retains much of the aspects of the decrypted digital content, thereby allowing most of the processing, that need to be done on decrypted digital content, to be performed in a more secure level.

Figure 3:
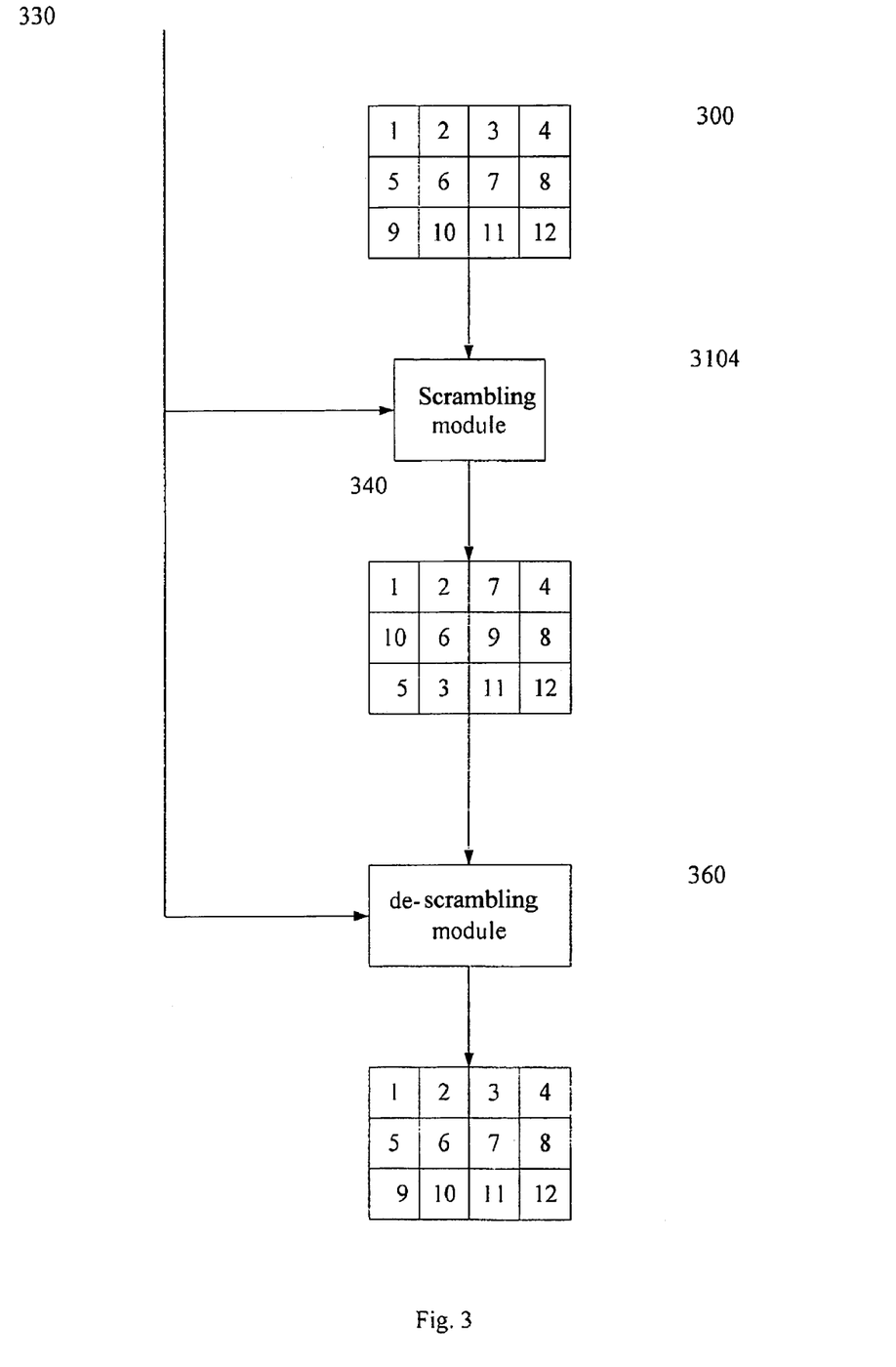
FIG. 3 is a simplified description of macro-blocks scrambling, operative in accordance with a preferred embodiment of the present invention.

Reference is now made to FIG. 3, which is a simplified description of macro-blocks scrambling, operative in accordance with a preferred embodiment of the present invention. The digital content 300 is divided to 12 macroblocks, which are scrambled by the scrambling module 3104, preferably using the side information 330. The scrambled digital content 340 can then be transferred in a more secure manner to the de-scrambling module 360, which reconstruct the correct order of the macro-blocks 370. The macroblocks can be the same macroblocks that are used for motion estimation in the standard MPEG format.

Figure 4:
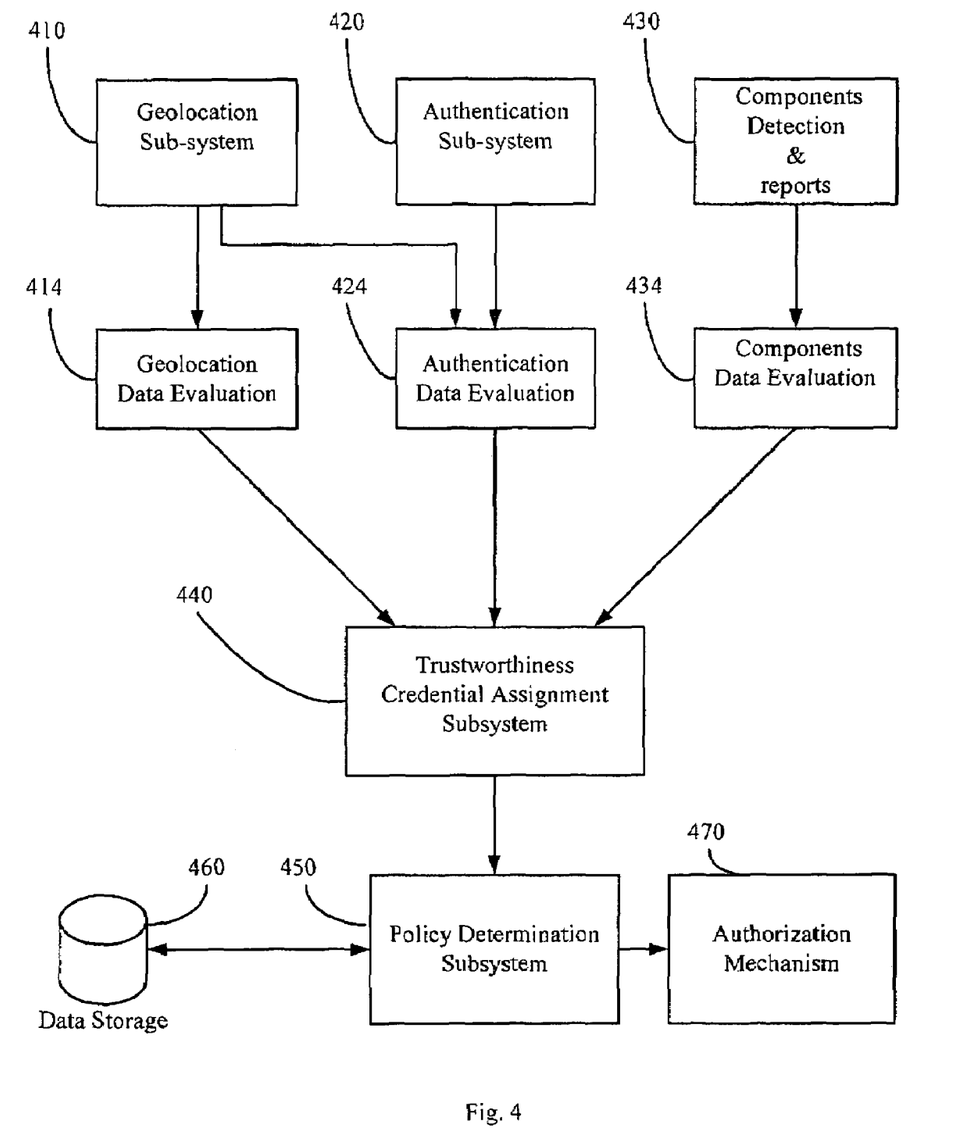
FIG. 4 is an illustration of a system for trustworthiness credential assignment, based on geo-location, authentication level and reports from software client, operative in accordance with a preferred embodiment of the present invention.

Turning now to FIG. 4, there is illustrated a system for trustworthiness credential assignment, based on geo-location, authentication level and reports from software client, operative in accordance with a preferred embodiment of the present invention. Resulting trustworthiness credentials may be used in order to determine what protective measures should be used, in order to achieve a satisfactory trade-off between ease-of-use and protection level and whether to allow the transaction (in the high risk cases). The geo-location subsystem 410 obtains information regarding the location of the user. Methods for obtaining geolocation data are described, e.g., in U.S. patent application Ser. No. 09/922,846. The geo-location data evaluation sub-system 414 uses the gathered data in order to assign credentials To the user. E.g., Coarse-grained geo-filtering can be used in order to determine whether the client comes from a state or a region that are notorious for not enforcing copyright protection laws. The authentication sub-system 420 is used to authenticate the user based on one or more of the known authentication methods (e.g., password-based or biometric-based authentication). The authentication data evaluation subsystem 424 receives data from the authentication subsystem 420, and preferably also from the geo-location subsystem 410: the geographical location of the user can be used in order to elevate the authenticity level, E.g., by checking the correlation between the stated address of the user and the geo-location data. Finally, another level of trustworthiness credentials can be established by knowing the software and hardware components that are used by the users in order to handle the digital content (e.g., digital content rendering, playing, displaying or recording). The components detection and reporting subsystem 430 detects components that are used for digital content handling and attempts to tamper with these components. If the said subsystem detects components that can be used in order to record or copy the data in an unauthorized manner, or to assist such an operation, or if attempts to tamper with these components are detected, it reports about them to the component data evaluation subsystem 434, which may use this data in order to reduce the trustworthiness level of the user, and preferably perform additional operations as dictated by the situation. The trustworthiness credential assignment subsystem 440 uses the data from the geo-location data evaluation subsystem 414, the authentication data evaluation subsystem 424, and the components data evaluation subsystem 434 in order to assign trustworthiness credentials to the user. The policy determination subsystem 450 obtain the said trustworthiness credentials, and uses them in order to establish a more permissive policy if the user is trustworthy, and a less permissive policy if the user is suspected.

In other embodiments of the present invention the policy differentiates between different levels of: delivered quality, cost/ease of use for the consumer and/or the usage of certain protection mechanism in the digital content delivery and/or displaying process. The policy determination subsystem 450 may use rules that are stored in the data storage 460 and may store reports and other relevant information in the database 460, preferably in an encrypted format. The output of the policy determination subsystem 450 is used as an input to an authorization mechanism 470.

Figure 5:
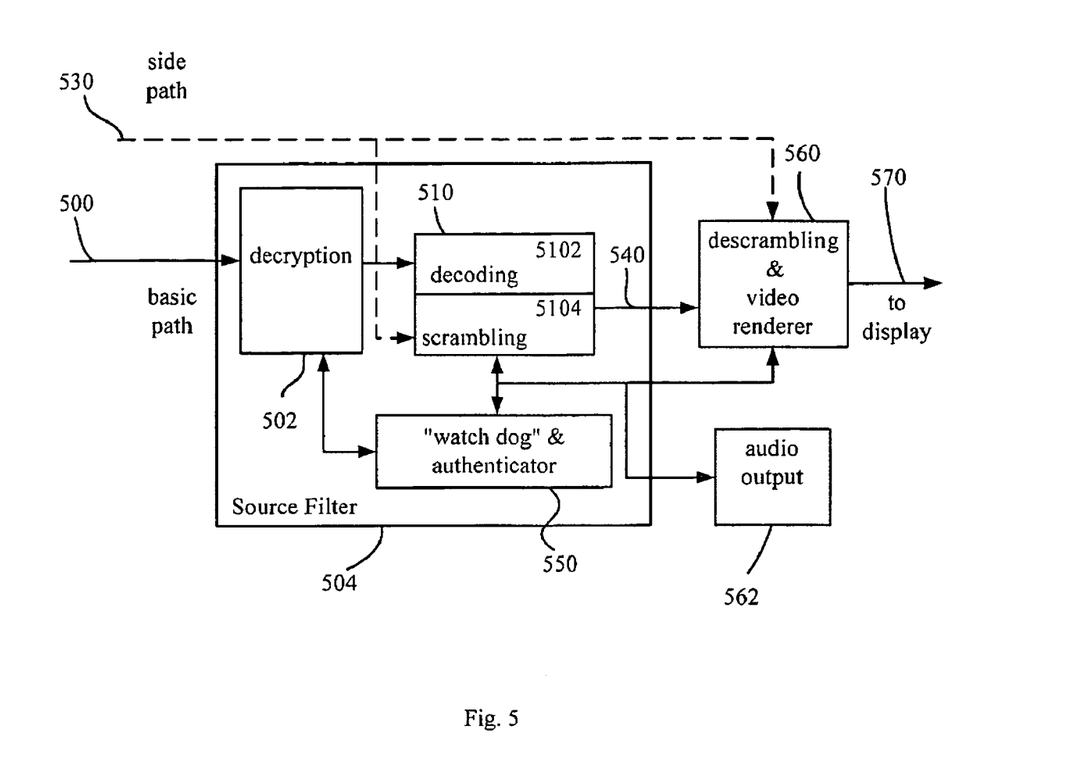
FIG. 5 is an illustration of a system, substantially similar to the system described in FIG. 2, operative in accordance with a preferred embodiment of the present invention, that further enhance the security of the path.

Turning now to FIG. 5, there is illustrated a system, substantially similar to the system described in FIG. 2, operative in accordance with a preferred embodiment of the present invention. The system further enhance the security of the path by incorporating methods for path authentication, path consolidation and, preferably, in-path decryption. In order to maintain path authentication, the system uses a software component 550, commonly referred as "watchdog", which assures that the path is composed only of components that should participate in it, and that it was not subjected to tampering before and/or during the passage of the digital content through the path. The path consolidation mechanism is preferably used in cases where the path is implemented using connected software components, commonly dubbed "software filters" (in a "filter graph"). In this case, the secure path is composed of tamper resistant consolidated filters, which use minimal external interfaces, thereby increasing the security of the system. In a preferred embodiment of the present invention, the number of filters is maintained as low as possible. In cases where no other constraint exists, only one such filter is included. In cases where compatibility with existing components or with a standard are required, the system is preferably composed of three filters: namely, source filter, video renderer, and audio output. The interface of each filter is preferably encrypted and/or secured using other methods. For encrypted digital content decryption is done within the secure video path; thereby eliminating the chance of intercepting decrypted digital content outside the secure video path.

Note that interface in this context could be performed in many ways, e.g., messaging protocols, program context, shared memory or stack. Also note that internal interfaces (such as the memory used for making calculations) may be externally accessed in many computer environments. Hence, a filter may have more interfaces than its designers intended.

Figure 6:
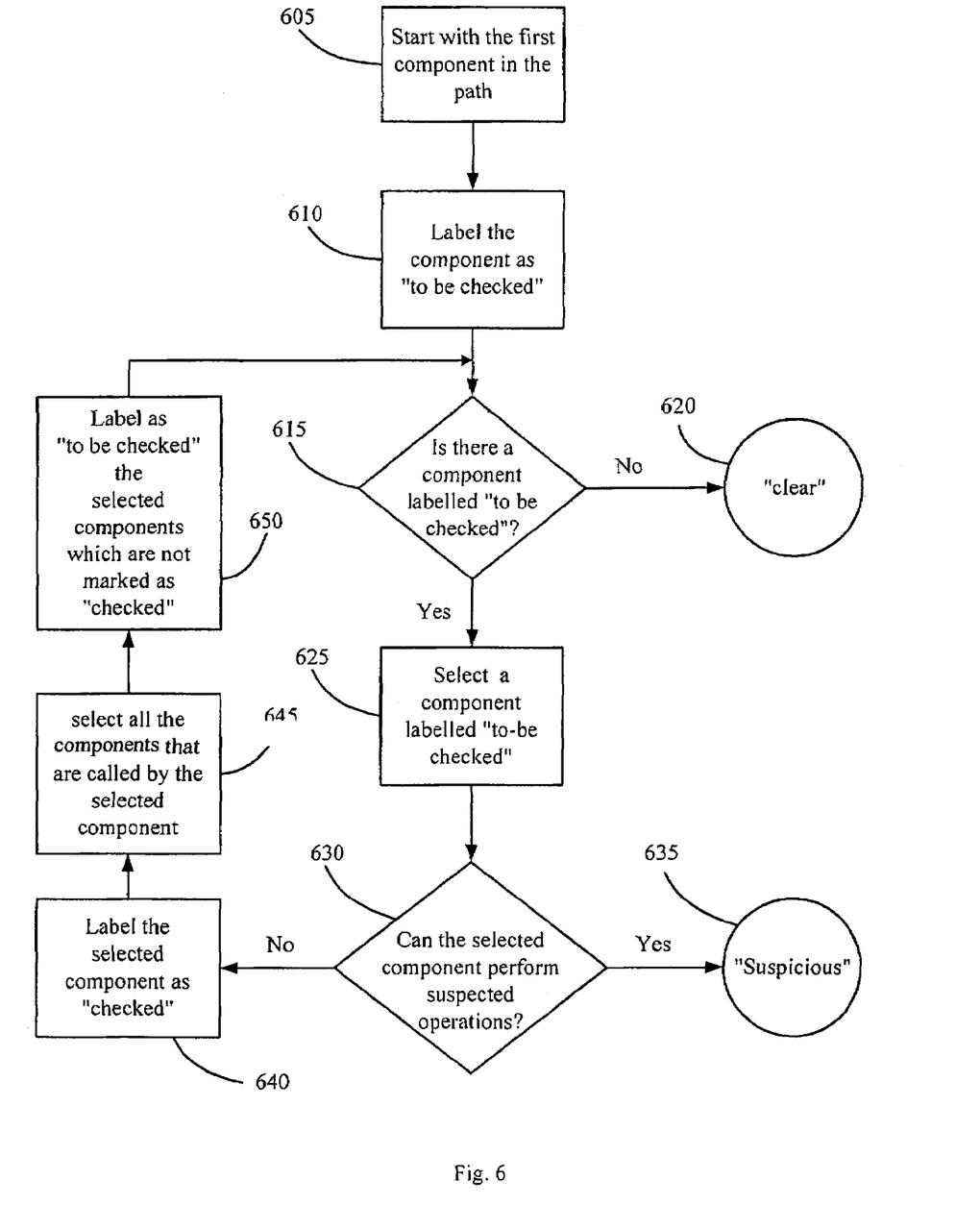
FIG. 6 is an illustration of a flowchart of a method, operative in accordance with a preferred embodiment of the present invention, that is used in order to locate infringing software components, such as "Trojan horses", in the secure video path.

Turning now to FIG. 6, there is illustrated a flowchart of a method, operative in accordance with a preferred embodiment of the present invention, that is used in order to locate infringing software components, such as "Trojan horses", in the secure video path. The flowchart depicts an algorithm that recursively looks for suspicious code in called components (i.e. code which may perform suspicious operations), effectively checking if such code exists within the components that may be called by the checked component.

The first step 605 selects the operating component to be checked, usually the first component in the path or filter graph. It is assigned a label—step 610—"to be checked" or "unchecked", designating it as an unchecked component (in this case the root component). Next—step 615—a successful termination condition is checked—'were all components designated for checking were checked and deemed OK?'. If the condition was satisfied—step 620—the path is deemed safe for digital content delivery and/or play. If the condition was not satisfied, the process continues—step 625—and a component is selected for checking (the identity of the component to be selected and the order of selection are not critical for the algorithm and dictates the sort of traversing of the underling call tree—DFS, BFS, etc. In a preferred embodiment of the present invention the mode of operation is DFS (Depth First Search) which dictates that the component to be selected should preferably be the last label component). Next—step 630—the component is checked for suspicious code. If such code exists in the component, a termination condition is met—step 635—and the path is deemed unsafe. If such code does not exist—step 640—the selected component is labeled "checked". Next—step 645—the group of components called by the selected component is selected. The components in the selected group which are not labeled as "checked" are labeled "to be checked"—step 650. At this stage the test in step 615 is recursively repeated and the process recursively continues.

Note that this algorithm can be easily expanded by changing steps 605, 610, to start with a group of components to be checked (for example if several sources exist for a certain digital content, or if the software performing the related operations contains several independent components).

Methods for identifying suspicious components might be based, e.g., an tracing current component's ingoing and/or outgoing function calls, monitoring the system registry and utilizing the operating system services.

In another embodiment of the present invention, the software components are searched using one of the known node-graph searching method, where each software component is regarded as a node in the node-graph and each software component's import (ingoing) and export (outgoing) routines are treated as directed branch. Infringement suspects are identified by monitoring various operations such as file operations, memory operations, communication operations, I/O operations, driver operations and others or by reading the software components' files (even while those components are running) and examining their digest or digital signature for authenticity and compliance with the security measurements.

In case of suspected infringement, the digital content streaming/downloading/playing/delivery may be stopped, and/or the suspected infringement information may be sent to a server that shall decide if to stop the digital content streaming/downloading/playing/delivery.

Figure 7:
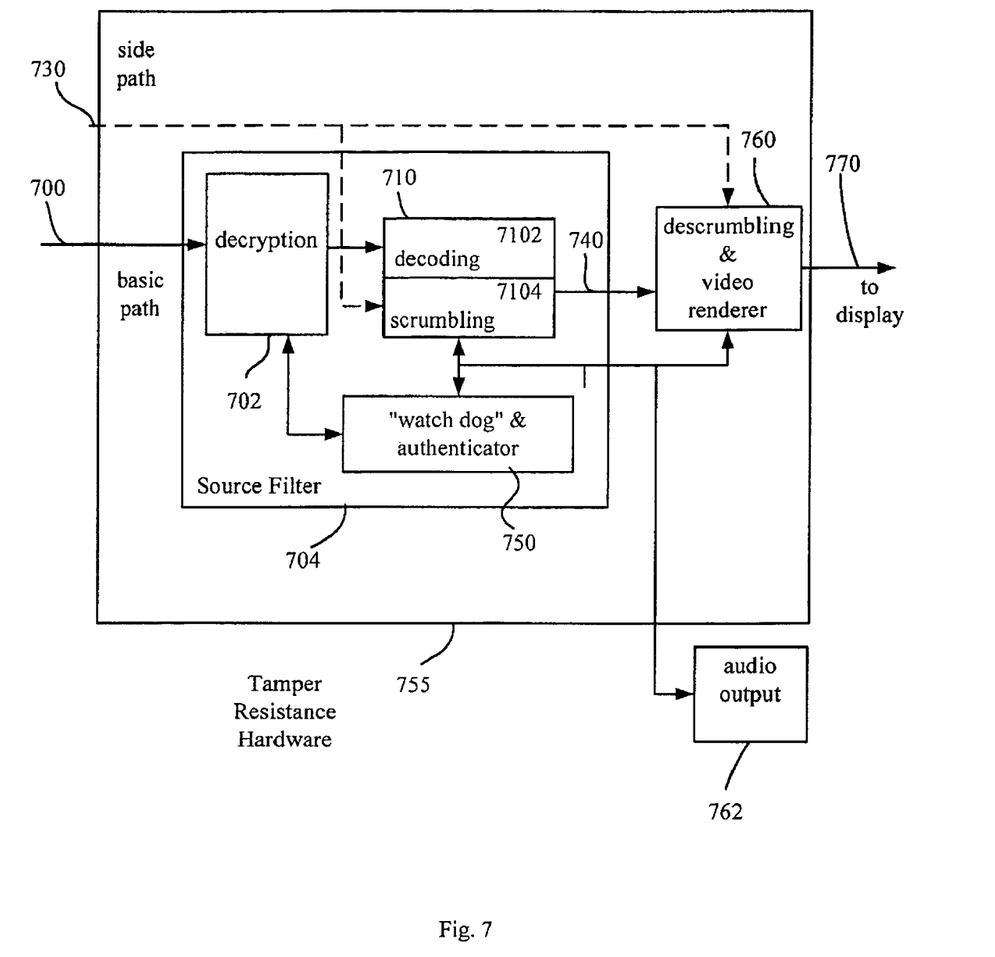
FIG. 7 is an illustration of security augmentation using hardware components, operative in accordance with a preferred embodiment of the present invention.

Turning now to FIG. 7, there is an illustration of security augmentation using hardware components 705, said hardware components can be a hardware implementation of either one of the components or sub-systems described above, or a combination of two or more of the aforementioned components and sub-systems.

Figure 8:
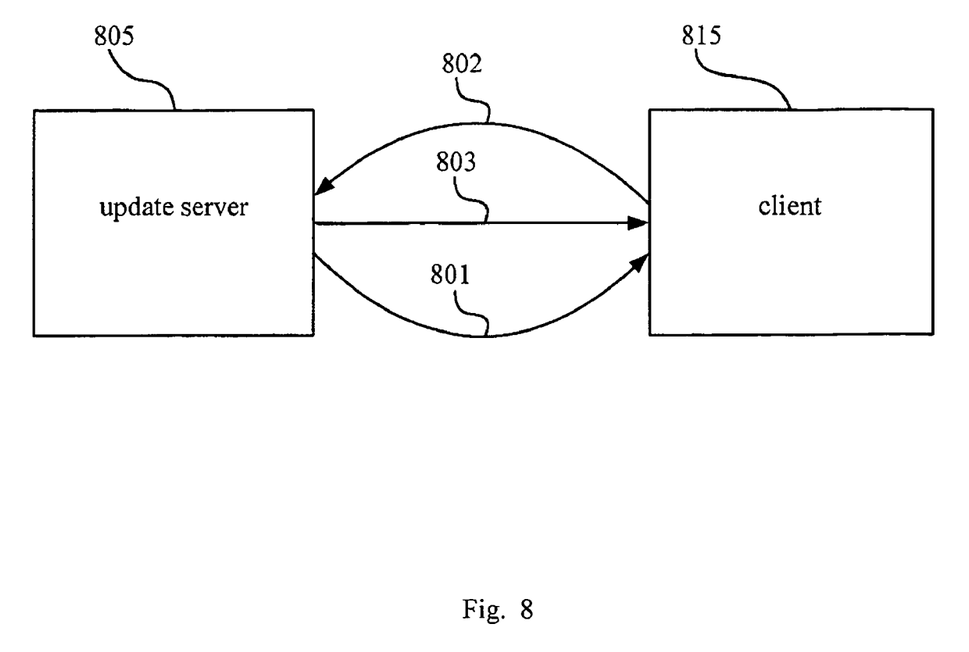
FIG. 8 is an illustration of a method for security improvements along the system lifecycle using automatic software updates, operative in accordance with a preferred embodiment of the present invention.

Turning now to FIG. 8, there is an illustration of a method for security improvements along the system lifecycle using automatic software updates, operative in accordance with a preferred embodiment of the present invention. In step 801, the update server 805 inform client 815 about the needed update. In step 802 the client 815 sends a request for an update and in step 803 the update server 805 sends client 815 the required update.

Figure 9:
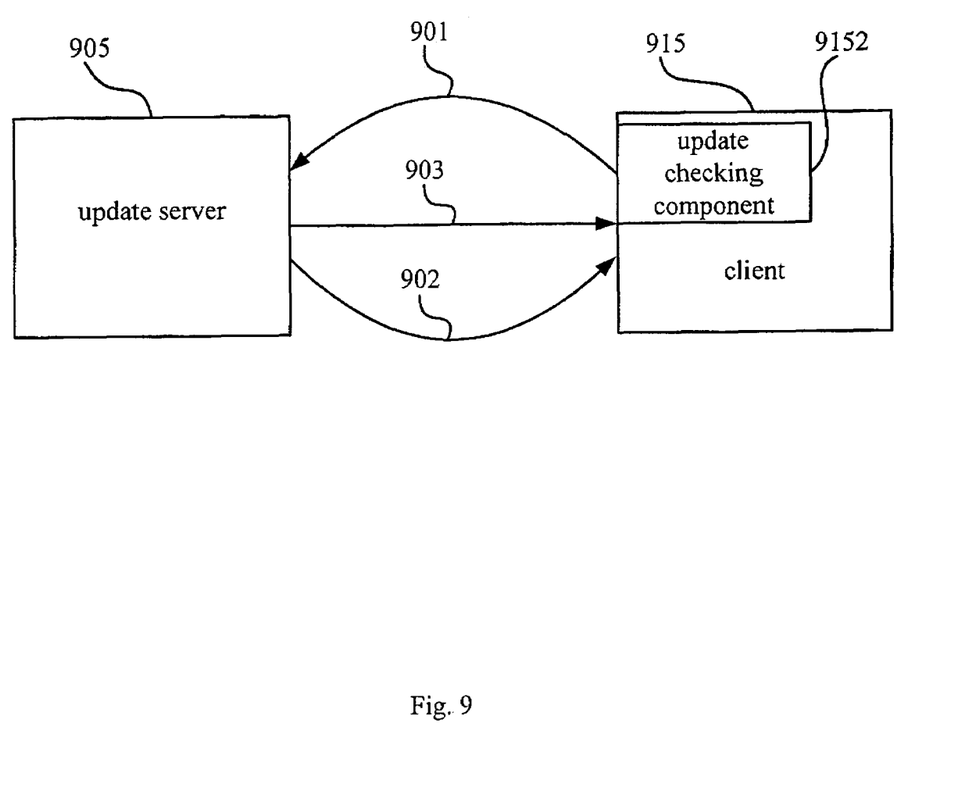
FIG. 9 is an illustration of another method for security improvements along the system lifecycle using automatic software updates, substantially similar to the method described in FIG. 8, operative in accordance with a preferred embodiment of the present invention.

Turning now to FIG. 9, there is an illustration of another method for security improvements along the system lifecycle using automatic software updates, substantially similar to the method described in FIG. 8, operative in accordance with a preferred embodiment of the present invention. In step 901 the update checking component 9152 in the client 915 ask update server 905 about needed updates on a regular base. In step 902 the update server 905 answer client 915 and in step 903 the update server 905 sends the required update to the client 915.

Figure 10:
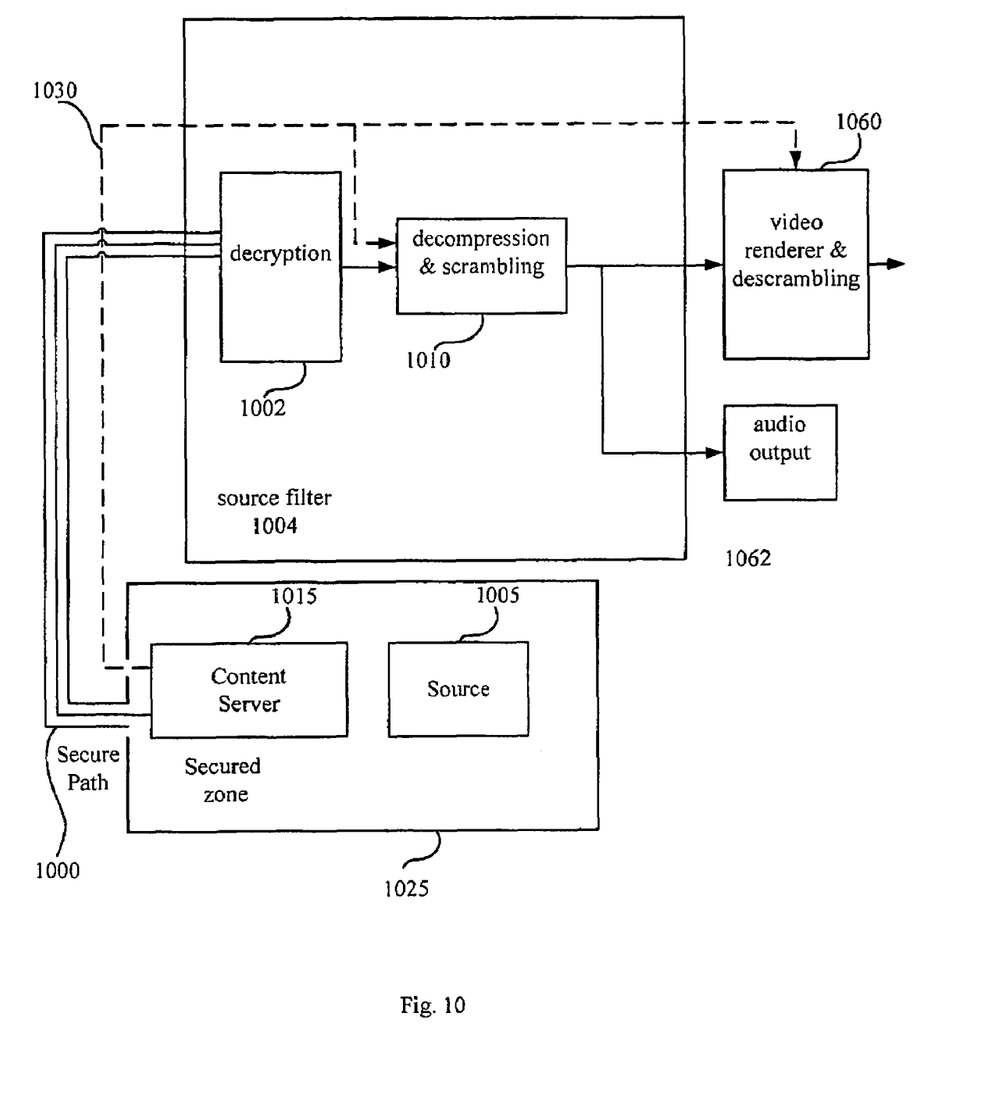
FIG. 10 is an illustration of a system, said system include a client that is substantially similar to the system illustrated in FIG. 2, where the source digital content and the digital content server reside in a secured zone, operative in accordance with a preferred embodiment of the present invention.

Turning now to FIG. 10, there is an illustration of a system, operative in accordance with a preferred embodiment of the present invention, said system include a client that is substantially similar to the system illustrated in FIG. 2, while the source digital content 1005 and the digital content server 1015 reside in a secured zone 1025. The source digital content is thereafter transferring via a secured path 1000, using a digital content server (e.g., a stream server) 1015. This way the entire path of the digital content, from the source to the player/display, is protected by encryption. In a preferred embodiment of the present invention, the digital content server pack the digital content, or parts of the digital content, in a "vehicle format", such as ASF, in order to increase the level of compatibility with existing software clients.

It is appreciated that one or more steps of any of the methods described herein may be implemented in a different order than that show, while not departing from the spirit and scope of the invention.

While the present invention may or may not have been described with reference to specific hardware or software, the present invention has been described in a manner sufficient to enable persons having ordinary skill in the art to readily adapt commercially available hardware and software as may be needed to reduce any of the embodiments of the present invention to practice without undue experimentation and using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

We claim:

1. A method for secure distribution of digital content to an untrusted environment of an intended recipient of said digital content, comprising the steps of:
    gathering information about said digital content's intended recipient environment;
    producing trustworthiness credentials about said intended recipient environment based on said information;
    selecting protective measures for distributing said digital content in accordance with said trustworthiness credentials;
    distributing digital content secured by said selected protective measures to said untrusted environment;
    constructing a trusted environment within said untrusted environment;
    constructing from said digital content at least two digital input sources, said digital input sources being operable in combination in order to produce a screen rendered version of said digital content;
    transferring said digital content to said trusted environment such that each of said input sources is transmitted via a different path; and
    combining said input sources within said trusted environment in order to produce said screen rendered version of digital content, said trusted environment otherwise preventing access to said digital input sources.

2. A method according to claim 1 wherein said digital content is a document.

3. A method according to claim 1 wherein said digital content is multimedia digital content.

4. A method according to claim 3 wherein said multimedia digital content consists of at least two different streams.

5. A method according to claim 1 wherein said trusted environment comprises a software component.

6. A method according to claim 1 wherein said trusted environment comprises a hardware component.

7. A method according to claim 1 wherein said trusted environment comprises a firmware component.

8. A method according to claim 1 wherein said trusted environment comprises at least two components.

9. A method according to claim 8 wherein at least one of said components comprises a software component.

10. A method according to claim 1 wherein at least one of said input sources comprises a scrambled copy of said digital content, and at least one other input source comprises the information needed for said reproduction.

11. A method according to claim 1 wherein a group of at least two of said input sources comprises a function of a scrambled copy of said digital content, and at least one other input source comprises the information needed for reconstruction.

12. A method according to claim 1 wherein said digital content is split into said separate input sources in a trusted server, said server is operable to deliver said digital content to said trusted environment in the form of said separate input sources.

13. A method according to claim 1 wherein said credentials comprise information gathered in the past.

14. A method according to claim 1 wherein said credentials comprise information about the environment into which said digital content is to be distributed.

15. A method according to claim 1 wherein said credentials comprise reports from at least one trusted component.

16. A method according to claim 1 wherein said credentials comprise geo-location information.

17. A method according to claim 1 wherein said credentials comprise geo-location authentication level information.

* * * * *